Jan. 20, 1931.  G. A. BARDET ET AL  1,789,722
FEED SLIDE FOR KEY DIPPING MACHINES
Filed March 10, 1928   2 Sheets-Sheet 1
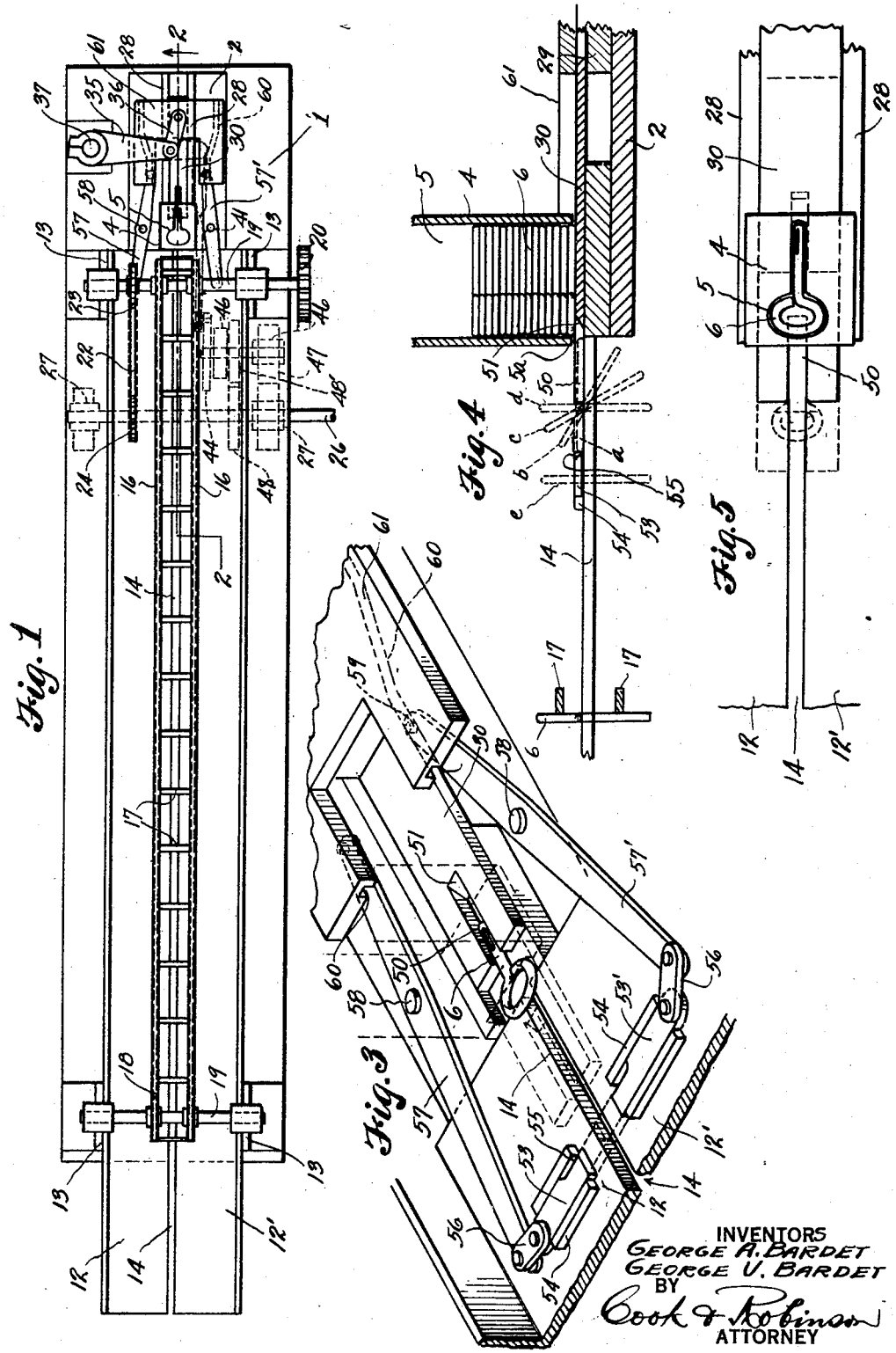
INVENTORS
GEORGE A. BARDET
GEORGE V. BARDET
BY
Cook & Robinson
ATTORNEY

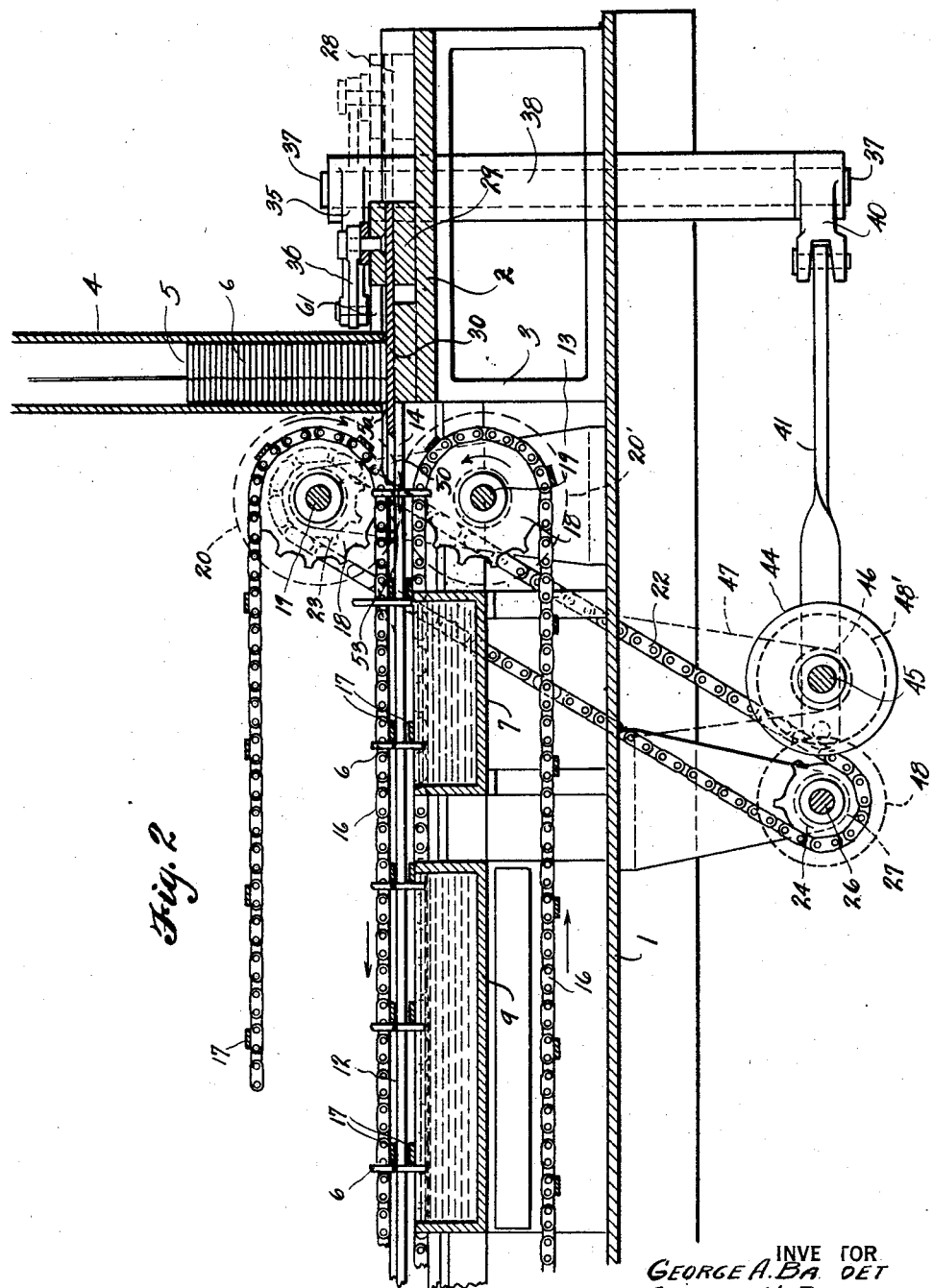

Patented Jan. 20, 1931

1,789,722

UNITED STATES PATENT OFFICE

GEORGE A. BARDET AND GEORGE V. BARDET, OF BERKELEY, CALIFORNIA, ASSIGNORS TO M. J. B. CO., OF SAN FRANCISCO, CALIFORNIA, A CORPORATION OF DELAWARE

FEED SLIDE FOR KEY-DIPPING MACHINES

Application filed March 10, 1928. Serial No. 260,660.

This invention relates to improvements in key dipping machines of that character designed for dipping the keys which are to be used with key opened cans or containers; the dipping being for the purpose of applying to the keys a very small amount of solder which serves, later, to solder the keys to the cans.

The present invention is in the nature of an improvement in the key dipping machine described and illustrated in our co-pending application executed on the 23rd day of January, 1928, filed February 6, 1928, under Serial Number 252,357, and it relates particularly to the feed slide whereby keys are delivered from the supply magazine into the slotted guideway or carrier along which they are advanced in suspended position, for dipping their ends in solder.

The machine in which the present improved feed slide is embodied, briefly described, comprises a magazine in which a supply of keys to be dipped are stacked flatly one upon another and from which they may be delivered, one at a time, by the action of a reciprocating feed slide, into a guideway along which they are advanced by conveyors operating parallel with the guideway.

Located below the guideway slot are receptacles within which a soldering flux and molten solder are contained, and as the keys are moved across these receptacles their lower end portions are caused to be dipped, first in the flux then in the solder, so that small amounts of solder will adhere to the ends of the keys and will harden thereon as it cools. Keys to which solder has been applied in this manner are then assembled with their cans and a certain amount of heat is applied thereto which melts the solder and causes it, on cooling, to fix the keys to the cans. Keys of various kinds are adapted to be dipped by machines of this character, but the type of key which we use, and for which the present feed slide is particularly designed, is made from a single piece of wire forming a straight key shank with a loop at one end whereby the key may be turned. Keys of this kind, when passing through the dipping machine, are held suspended by the looped end portions.

In the machine described in our co-pending application, the keys were discharged shank end first by the feed slide and it was intended that the shank portions should fall by gravity into the slot of the guideway so that they would assume a vertical, suspended position necessary for dipping their ends. Additional devices, operating in conjunction with the feed slide, were also employed to make this position of the keys more certain but still the operation was not entirely satisfactory or positive, and keys often failed to fall into the slot which resulted in jams occurring and time being required for clearing the machine for continuing operation.

In view of the above undesirable result, it has been the principal object of this invention to provide a simplified key feed mechanism which is positive in the action of delivering each key into the machine in the desired suspended position for dipping, which does this without possibility of jams occurring and which insures the delivery of but one key at a time.

Other objects of the invention reside in the various details of construction and combination of parts as will hereinafter be described.

In accomplishing these and other objects, we have provided the improved details of construction, the preferred forms of which are illustrated in the accompanying drawings, wherein—

Figure 1 is a plan view of a key dipping machine equipped with a key feed mechanism made in accordance with details of the present invention.

Figure 2 is an enlarged, sectional view of the key receiving end of the machine taken substantially on line 2—2 in Figure 1.

Figure 3 is a fragmental, perspective view showing the relation of the key feed slide, when in retracted position, to the lower key in the supply magazine.

Figure 4 is a sectional view of the feed slide and a portion of the guideway slot, illustrating the movement of a key from horizontal to vertical suspended position when pushed from the supply magazine into the slot.

Figure 5 is a plan view of the parts as shown in Figure 4.

Referring more in detail to the drawings—

The working mechanism of the machine is mounted upon a horizontal bed plate 1, on one end of which a feed table 2 is supported by end frames 3. Erected on the forward edge of the table is a vertical magazine 4 provided with a channel 5 within which the keys 6, which are to be dipped, are stacked, one upon the other, in such manner that they will feed downwardly in accordance with the discharge of keys from the lower end of the magazine. Supported on the bed plate, forwardly of the table, is an open container 7 filled with a soldering flux, and in alinement with this container is a pot 9 wherein solder is kept in a molten state. Extending from the feed table directly over the flux and solder containers, is a key guideway formed of two horizontally disposed plates 12 and 12′ which, adjacent their ends, are fixed to standards 13 attached to the bed plate. The plates, 12 and 12′, are fixed with their adjacent edges in such spaced relation as to provide an intermediate slot 14 from end to end of the guideway. This slot, at the receiving end, terminates adjacent a discharge slot 5a provided in the lower end of the key supply magazine 4 and it is of such width that the shank portions of the keys may swing downwardly therethrough to suspended positions so that, as the keys are moved along the guideway over the containers 7 and 9, their lower ends will be caused to be dipped, first, in the flux and then, in the solder.

The means provided for advancing the keys along the guideway consists in the present instance of paired conveyer belts 16 which operate together and in parallel relation at opposite sides of the slot above and below the plates 12 and 12′. Cross bars 17 extend between the two belts above and the two belts below the guideway for engaging the keys to push them along the slot. As here illustrated, the conveyer belts are carried by sprocket wheels 18 on cross shafts 19 extended between transversely alined standards 13. The movement of the four belts is synchronized by intermeshing gears 20 and 20′ fixed to the ends of shafts 19 and they are driven by a sprocket chain belt 22 which operates over a sprocket wheel 23 fixed on a shaft 19 and about a similar sprocket 24 fixed on a driven shaft 26 supported in bearings 27 fixed to the underside of the bed plate.

Formed centrally on the table top 2, in the longitudinal direction of the machine, are parallel guide ribs 28—28, and reciprocally contained between these, is a feed block 29 to which one end of the key feed slide 30 is fixed. The forward end of the feed slide is adapted, on each forward movement of the block to engage and push the lower key of the stack from the magazine and into a position at which it will be taken up and advanced through the machine by the conveyer belts. It is reciprocated by an actuating lever 35 to which it is pivotally connected through the intermediacy of a link 36. The lever 35 is fixed horizontally to the upper end of a rock shaft 37 carried in a vertical sleeve 38 fixed to the bed plate. At its lower end the shaft 37 has a lever arm 40 fixed thereto which is connected at its end to a link 41 which, in turn, is connected pivotally and eccentrically to a wheel 44 on the end of a shaft 45 revolubly mounted parallel with the shaft 26 in bearings 46 provided at the lower ends of brackets 47 that are fixed to the underside of the bed plate. Shaft 45 is driven by intermeshing gears 48—48′ on shafts 26 and 45 and rotation of shaft 45 causes the wheel 44 and link 41 to impart oscillatory motion to the shaft 37 and lever 35, which, in turn, causes reciprocal action of the feed slide and this results in delivering the keys, one at a time, from the discharge slot 5a at the lower end of the magazine, into the guideway.

The keys are so positioned in the magazine that they will be pushed out, looped end first, and it is the gist of this invention to provide a feed slide construction whereby each key will be delivered into the guideway in such position that its shank portion will fall, of its own weight, downwardly through the slot 14 and be held in a suspended position by the loop at its upper end. As is best shown in Figures 3, 4 and 5, the feed slide is provided at the key engaging end with a longitudinally directed slot 50 which, at its inner end, terminates in an upwardly and rearwardly beveled surface 51. When the feed slide is withdrawn, that is, when drawn to the retracted position as shown in Figure 4, the shank portion of the lower key in the supply magazine drops into the slot 50; then, as the slide is advanced, the forward end portions thereof at opposite sides of the slot engage with the loop of the key and cause the key to be pushed from the magazine into the guideway, looped end first. When the feed slide is extended, the slot 50 therein coincides with the receiving end of the guideway slot 14 and, as soon as the key has been advanced sufficiently that the end of its shank will clear the bottom wall of the magazine, the shank will swing downwardly from dotted line position "a", of Figure 4, through the positions "b" and "c" to the vertical suspended position "d". When the feed slide is completely advanced, the key is moved to that position indicated at "e" in Figure 4, where it will be engaged by cross bars 17 on the belts above and below the guideway.

By forming the base end of the slot in the feed slide with the upwardly and rearwardly beveled surface 51, there is no possibility of the slide advancing more than one key at a time, for should the end of the next lower key in the magazine drop down into the slot 50 it will slide over surface 51 when the slide is advanced and the key will be moved upwardly to permit the slide to pass freely beneath it.

In order than any key, which does not of its own weight fall to suspended position as it is advanced from the feed magazine over the slot 14, will be actuated to this position mechanically, there is provided a pair of slides 53—53' operable in guides 54 on the plates 12—12' transversely of the slot and at opposite sides thereof closely adjacent the magazine, as shown in Figure 3. The adjacent ends of these slides are adapted to be brought into abutment over the slot and their forward edges at this point are beveled upwardly, as at 55 in Figure 4, so that the key loop, on striking this inclined surface, will cause the key shank to swing downwardly to vertical position within the slot 14. The slides 53—53' are actuated inwardly and outwardly by connection at their outer ends with links 56 which, in turn, connect with levers 57—57' extended along the feed slide at opposite sides thereof. These levers are centrally pivoted, as at 58, to the table 2 and have pins 59 at their outer ends extended into cam slots 60 in the under side of a plate 61 that is fixed to the upper side of the feed block. Reciprocal action of the plate with the feed slide causes a synchronized action of the slides which brings them into position at times when the keys are advanced and then throws them out so as to permit the keys to pass by when engaged by the forwardly moving cross bars of the conveyer belts.

By arranging the keys in the magazine in the manner illustrated and described, and by providing the feed slide with a receiving slot 50 as shown which registers, when the slide is extended, with the receiving end of the slot 14 of the guideway, the keys will be moved by forward action of the slide to a position at which the shanks will drop of their own weight to suspended position. Possibility of jams occurring because of keys being delivered crosswise of the slot 14 is eliminated and a positive and satisfactory feed device is provided.

Having thus described our invention, what we claim as new therein and desire to secure by Letters Patent, is:

1. In a machine of the character described, a key magazine, a slotted guideway, a feed slide reciprocally operable between retracted and extended positions to push keys from the lower end of the magazine into the guideway and having a slot therein within which the shank of the lower key in the magazine will fall when the slide is retracted and which is adapted to register with the guideway slot when the slide is extended, to thereby position the key shank so that it will drop into the guideway slot.

2. In a machine of the character described, a key supply magazine, a guideway having a longitudinal, downwardly opening slot therein, a feed slide operable reciprocally between retracted and extended positions to deliver keys, one at a time, from the lower end of the magazine into the guideway; said slide having a slot opening to the end thereof adapted, when the slide is retracted, to receive therein the shank portion of the lower key in the magazine and, when the slide is extended, to coincide with the receiving end of the slot of the guideway to aline the key therewith so that its shank will swing by gravity downwardly through the guideway slot and the key will be held suspended therein by its upper end portion.

3. A device as in claim 2, wherein the inner end of the feed slide slot is beveled rearwardly and upwardly for the purpose set forth.

Signed at San Francisco, California, this 11th day of February 1928.

GEORGE A. BARDET.
GEORGE V. BARDET.